United States Patent [19]

Isono

[11] Patent Number: 4,570,963
[45] Date of Patent: Feb. 18, 1986

[54] FRONT WHEEL SHOCK ABSORBING SYSTEM FOR MOTORCYCLES

[75] Inventor: Tokio Isono, Tokyo, Japan

[73] Assignee: Honda Giken Kogyo Kabushiki Kaisha, Tokyo, Japan

[21] Appl. No.: 561,108

[22] Filed: Dec. 13, 1983

[30] Foreign Application Priority Data

Dec. 15, 1982 [JP] Japan ................ 57-219483
Dec. 15, 1982 [JP] Japan ................ 57-219484

[51] Int. Cl.⁴ .............................. B62K 25/04
[52] U.S. Cl. ......................... 280/277; 280/279
[58] Field of Search ........... 280/277, 276, 275, 279, 280/285, 286, 21, 16

[56] References Cited

U.S. PATENT DOCUMENTS

| | | | |
|---|---|---|---|
| 3,425,707 | 2/1969 | Horiuchi | 280/21 R |
| 4,186,936 | 2/1980 | Offenstadt | 280/277 |
| 4,212,481 | 7/1980 | Ribi | 280/276 |
| 4,401,316 | 8/1983 | Miyakoshi | 280/279 |
| 4,406,475 | 9/1983 | Miyakoshi | 280/279 |
| 4,433,850 | 2/1984 | Miyakoshi | 280/277 |
| 4,444,406 | 4/1984 | Isono | 280/277 |

FOREIGN PATENT DOCUMENTS

572966  10/1945  United Kingdom ............... 280/286

*Primary Examiner*—Joseph F. Peters, Jr.
*Assistant Examiner*—Everett G. Diederiks, Jr.
*Attorney, Agent, or Firm*—Armstrong, Nikaido, Marmelstein & Kubovcik

[57] ABSTRACT

A front wheel shock absorbing system for motorcycles in which a damper for a front wheel of the motorcycle is disposed on the body frame side and in which forces applied to the front wheel are transmitted to the damper through a force transmitting member included in a front suspension mechanism and further through a slide member which is slidably fitted in a head pipe.

4 Claims, 9 Drawing Figures

FRONT WHEEL SHOCK ABSORBING SYSTEM FOR MOTORCYCLES

BACKGROUND OF THE INVENTION

1. Field of the Invention

The present invention relates to a front wheel shock absorbing system for motorcycles.

2. Description of Prior Art

In conventional front suspension for motorcycles, dampers are included in a steering mechanism, as shown, for example, in a link motion type front suspension mechanism disclosed in U.S. Pat. No. 4,212,481 (Ribi), as well as in the extremely common, telescopic type front suspension is which the front fork per se constitutes a hydraulic cylinder. Consequently, the entire steering mechanism becomes heavy and hence the moment of inertia in steering becomes large, thus affecting the handling operation. On the other hand, in some particular type of a front suspension using only one damper, the damper is disposed in a relatively high position in a steering mechanism, so that it is difficult to set the center of gravity of the steering mechanism in a position which is preferable from the standpoint of steering stability.

The present invention has been accomplished for effectively overcoming the above-mentioned drawbacks of the prior art.

SUMMARY OF THE INVENTION

According to the present invention, there is provided a front wheel shock absorbing system in a motorcycle having a body frame, a head pipe secured to a front end of said body frame, a front wheel and a front wheel suspension mechanism for supporting said front wheel and including at least one motion member adapted to move in accordance with up and down movements of the front wheel, said front wheel shock absorbing system comprising: a force transmitting member having one end connected to said motion member for transmitting an external force applied to the front wheel; a slide member having one end connected rotatably to the other end of said force transmitting member, the slide member being at least partially inserted into the head pipe of the motorcycle slidably in the axial direction of the head pipe; and a damper mounted on body frame of the motorcycle and operatively connected with the slide member.

Accordingly, it is an object of the present invention to provide a front wheel shock absorbing system capable of affording a motorcycle the reduction in weight of a steering system to thereby decrease the moment of inertia in steering operation, and also capable of affording the motorcycle the improvement in the steering stability.

Preferred embodiments of the present invention will be described in detail hereinunder with reference to the accompanying drawings, from which further features, objects and advantages of the present invention will become apparent.

DETAILED DESCRIPTION OF PREFERRED EMBODIMENTS

Figure 1:
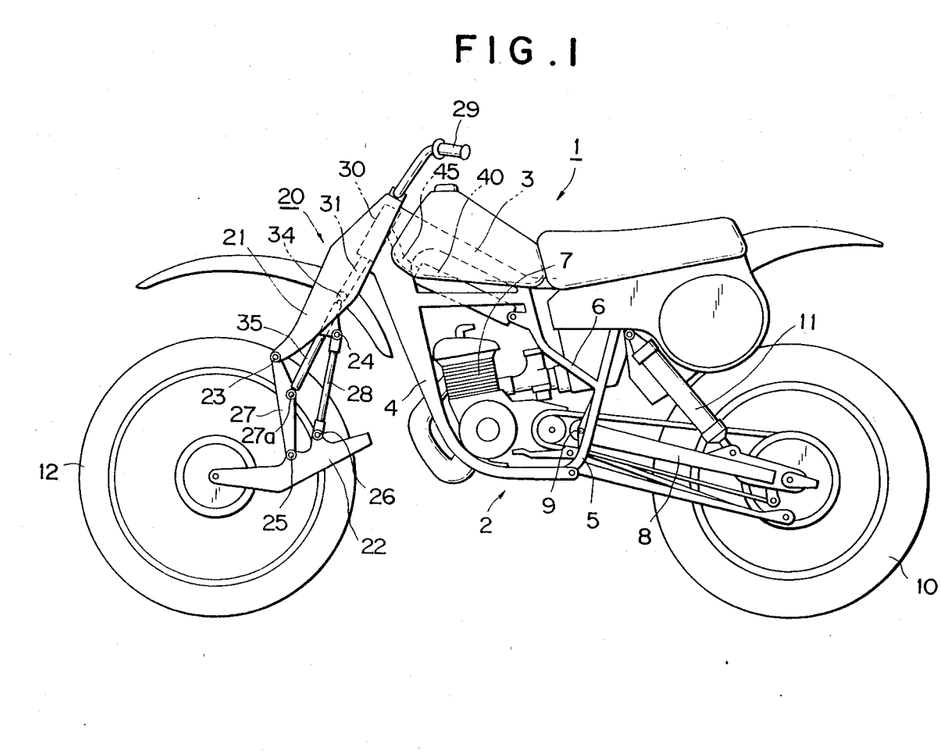
FIG. 1 is an entire side view of a motorcycle provided with a front wheel shock absorbing system according to a first embodiment of the present invention.

Referring first to FIG. 1, there is illustrated a motorcycle indicated at the reference numeral 1, the motorcycle 1 having a body frame 2 which is composed of a main frame 3, a down-tube 4, a rear frame 5 and a reinforcing frame 6, with an engine 7 being mounted on the body frame 2. The rear portion of the body frame 2 is connected to the front end of a rear fork 8 vertically pivotably through a pivot shaft 9, and a rear wheel 10 is rotatably supported by the rear end of the rear fork as shown in the figure. Further, a damper 11 is mounted between the rear fork 8 and the body frame 2 to effectively absorb and cushion the impact transmitted from the rear wheel 10 through its buffer action.

On the other hand, a front suspension mechanism 20 which constitutes a front fork is composed of an upper fork 21, a lower fork 22 which supports a front wheel 12 rotatably at its front end, and front and rear arms 27 and 28 upper ends of which are pivoted to the lower end of the upper fork 21 with pins 23 and 24 respectively and lower ends of which are pivoted to the lower fork 22 with pins 25 and 26 respectively.

Figure 3:
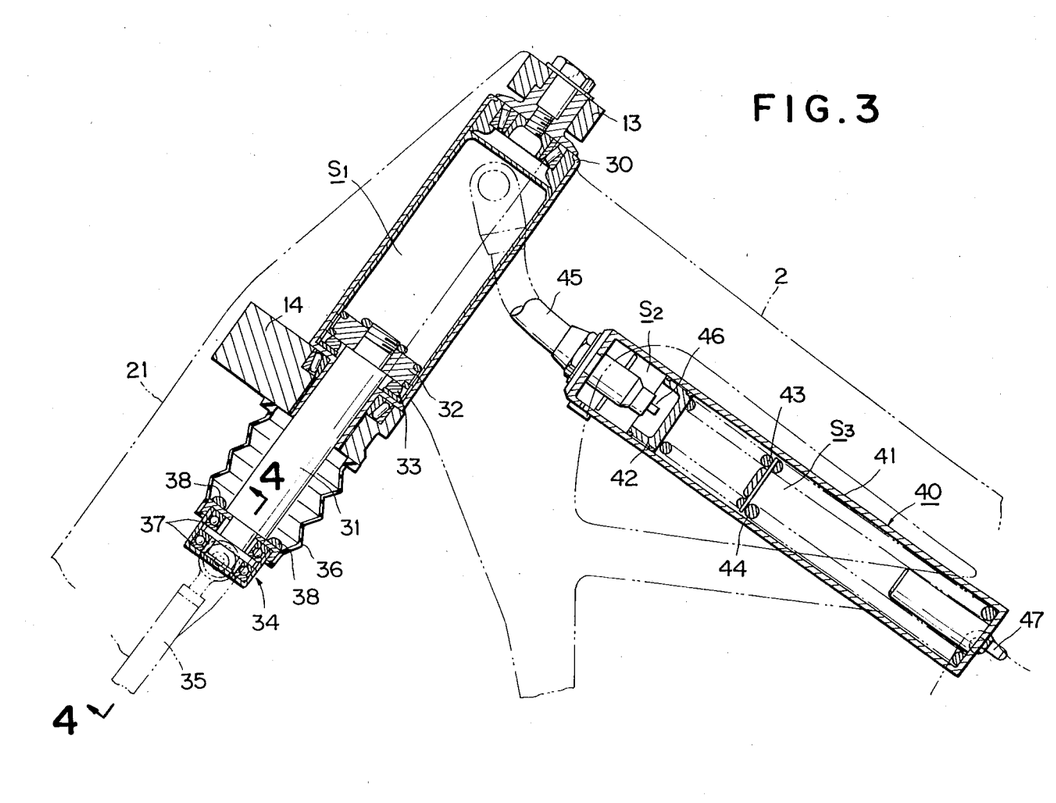
FIG. 3 is a cutaway side view of the front wheel shock absorbing system shown in FIG. 2.

The upper fork 21, as shown in FIG. 3, is connected to the body frame 2 so that it can be steered right and left through upper and lower bridges 13 and 14 of a head pipe 30 which is fixed to the front end of the upper portion of the body frame 2, the upper and lower bridges 13 and 14 being disposed respectively above and below the head pipe 30 and adapted to be turned right and left in accordance with steering operations of a handle 29.

The front suspension mechanism 20, which constitutes a link mechanism having a quadrilateral side link mechanism, undergoes deformations through the pivot points 23 through 26 when the front wheel 12 moves up and down due to external forces applied thereto during running of the motorcycle 1. In this case, assuming that the upper fork 21 is a fixed link, the lower fork 22, front arm 27 and rear arm 28 can be assumed to be moved links.

Referring back to FIG. 1, the lower end of a compression rod 35 is pivoted to a substantially intermediate portion of such movable link 27 through a pin 27a, while the upper end of the rod 35 is connected to the lower end of a piston rod 31 through a bearing head 34 so that it can turn right and left, the piston rod 31 being partially inserted slidably into the head pipe 30 which constitutes a hydraulic cylinder. Thus, the rod 35 functions to transmit the force exerted on the front wheel 12 to the piston rod 31 which is a slide member. On the other hand, the head pipe 30 constituted as a hydraulic cylinder is connected through an oil hose 45 to a hydraulic damper 40 which is attached to the body frame 2.

Figure 2:
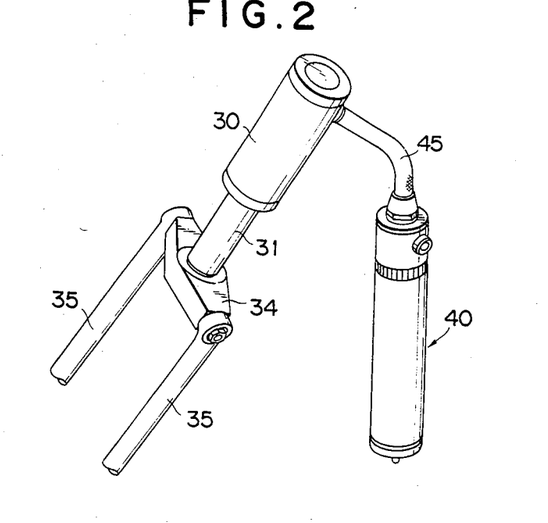
FIG. 2 is an entire perspective view of the front wheel shock absorbing system shown in FIG. 1.

The force transfer path from the rod 35 up to the damper 40 is as shown in FIG. 2. In the first embodiment of the present invention, the compression rod 35, bearing head 34, piston rod 31, head pipe 30 serving as a hydraulic cylinder, oil hose 45 and damper 40 constitute a front wheel shock absorbing system.

The foregoing quadrilateral-side link mechanism is present on each side of the front wheel 12, and the compression rod 35 is also disposed on each side of the front wheel.

Referring now to FIG. 3, there are shown in detail the internal construction of the front wheel shock absorbing system as well as its relation of arrangement to the body frame and upper fork. The lower end portion of the piston rod 31 is supported by thrust bearings 37 which are enclosed in the bearing head 34 which connects the compression rods 35 to the piston rod 31. The bearing head can thus turn right and left. Consequently, the piston rod 31 does not turn even when the foregoing front suspension mechanism including the rods 35 is turned about the axis of the head pipe 30 in accordance with steering operation of the handle 29.

In the interior of the head pipe 30 is defined a hydraulic oil chamber $S_1$, and the piston rod 31 extends through the bottom bridge 14 into the oil chamber $S_1$. The piston rod 31 is provided at its upper end with a piston 32 adapted to slide within the oil chamber $S_1$.

Further, the hydraulic damper 40 which is connected to the oil chamber $S_1$ through the oil hose 45 has a cylinder 41 in which is slidably fitted a piston 42 to partition the interior of the cylinder into an oil chamber $S_2$ for communication with the oil chamber $S_1$ and an air chamber $S_3$. Within the air chamber $S_3$ are disposed springs 43 and 44 in a compressed state, whereby the piston 42 is urged to the left in FIG. 3, namely, in a compressing direction against the oil chamber $S_2$. Moreover, the interior of the air chamber $S_3$ is charged with air of a predetermined pressure through an air valve 47 which is attached to the lower end portion of the cylinder 41. It goes without saying that both oil chambers $S_1$ and $S_2$ and the oil hose 45 interposed therebetween are internally filled with hydraulic oil.

The front wheel shock absorbing system shown in FIG. 3 is in a state with no external force given to the front wheel, and a rebound rubber 33 is disposed on the bottom wall of the hydraulic oil chamber $S_1$, while a bumper rubber 38 is disposed on the upper surface of the bearing head 34. Further, the portion of the piston rod 31 exposed below the bottom bridge 14 is covered with a dust boots 36 disposed between the bridge 14 and the bearing head 34.

Figure 4:
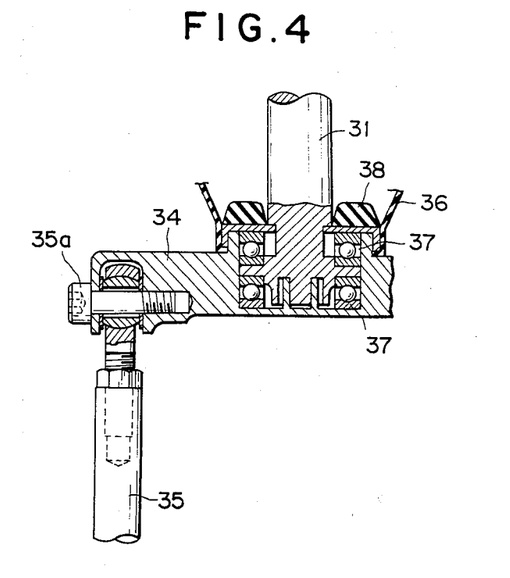
FIG. 4 is a sectional view taken along line 4—4 of FIG. 3.

As previously noted, each compression rod 35 is connected to the piston rod 31 through the bearing head 34 so that the bearing head can turn right and left. In this connection, as shown in FIG. 4, the compression rod 35 per se is pivotally secured to the bearing head 34 with a bolt 35a. Therefore, when an external force is applied to the front wheel 12, the rod 35 transmits the force to the piston rod 31 while pivoting about the bolt 35a with deformation of the quadrilateral link mechanism. On the other hand, even when the rods 35 and the bearing head 34 are turned right or left in response to the operation of the handle 29 as previously noted, this turning motion is not transmitted to the piston rod 31 because of the presence of the thrust bearings 37.

Referring back to FIGS. 1 and 3, when the front wheel 12 moves up and down due to external forces applied thereto, the constituent members of the quadrilateral-side link mechanism, namely, upper fork 21, lower fork 22, front arm 27 and rear arm 28, undergo deformations, so that the compression rod 35 connected at its lower end to the front arm 27 moves up and down. Consequently, the piston rod 31 connected at its lower end to the compression rod 35 through the bearing head 34 also moves up and down, so that the piston 32 fixed to the upper end of the piston rod 31 slides within the head pipe 30.

For example, if the piston 32 moves up within the head pipe 30, the oil in the hydraulic oil chamber $S_1$ is compressed and introduced from the oil chamber $S_1$ into the oil chamber $S_2$ of the damper 40 through the oil hose 45 and valve 46 in an amount corresponding to the volume proportional to the degree of entering of the piston 32 in the oil chamber $S_1$. The hydraulic oil thus introduced acts on the piston 42 which is fitted in the cylinder 41, and causes it to move to the right in Fig. 3 against the spring 43 and 44 and the resilient force of the air in the air chamber $S_3$. At the same time, a damping force is produced within the damper 40 due to the flow resistance induced when the hydraulic oil passes the valve 46. By virtue of this damping force and the above resilient force, the force transmitted from the front wheel 12 is effectively absorbed and cushioned by the damper 40, whereby the improvement of comfortableness is attained.

In the next place, as the piston 32 moves down in the head pipe 30, the oil is introduced from the hydraulic oil chamber $S_2$ into the hydraulic oil chamber $S_1$ of the head pipe 30 through the valve 46 and oil hose 45 in an amount corresponding to the volume proportional to the degree of descent of the piston 32, and a required damping force is produced within the damper 40 due to the flow resistance induced when the oil passes the valve 46.

In the above-described arrangement, since the damper 40 on the front wheel side is separated from the steering system and disposed on the side of the body frame 2, the weight of the steering system can be reduced by a weight corresponding to the weight of the damper 40, whereby the moment of inertia of the steering induced by the steering operation of the handle 29 can be diminished, thus resulting in that the steering operation of the handle 29 becomes lighter and the steering stability is improved.

Moreover, as compared with a front wheel shock absorbing system of the type in which a damper 40 is disposed on the upper portion of a vehicle body, the front wheel shock absorbing system of this embodiment permits lowering of the center of gravity of the vehicle body, whereby a further improvement of the steering stability can be attained.

In the above-described construction, moreover, it is apparent that the hydraulic damper 40 can be attached to any desired portion on the body frame, and therefore the freedom of design is remarkably improved. On this regard, it is apparent that the damper 40 need not be mounted so firmly. Because, the impact force transmitted from the hydraulic oil chamber $S_1$ is cushioned in the interior of the damper.

A front wheel shock absorbing system according to a second embodiment of the present invention will be described below basically with reference to FIG. 5.

Figure 5:
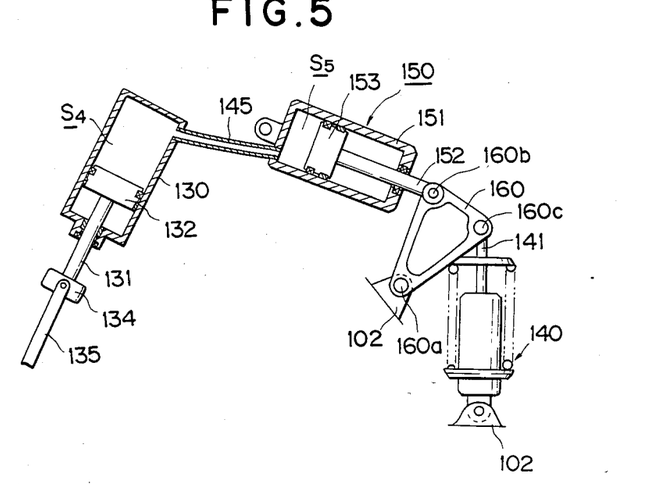
FIG. 5 is an entire cutaway side view of a front wheel shock absorbing system according to a second embodiment of the present invention.

In FIG. 5, indicated at 130 is a head pipe, at 132 a piston, at 131 a piston rod, at 134 a bearing head and at 135 a compression rod. These constituent members are the same as those described in the foregoing first embodiment. The numeral 140 denotes a damper for front wheel fixed to a body frame 102. The damper 140 comprises an ordinary hydraulic damper.

In this second embodiment, a cylinder unit 150 and a bell crank 160 are disposed between the cylinder 130 and the damper 140, and the piston rod 131 is operatively connected to a piston rod 141 of the damper 140.

A piston 153 is slidably fitted in the interior of a cylinder 151 of the cylinder unit 150, and a hydraulic oil chamber $S_5$ is defined by the piston 153 and the cylinder 151. The oil chamber $S_5$ is connected through an oil hose 145 to a hydraulic oil chamber $S_4$ formed within the cylinder or head tube 130. A piston rod 152 is connected at one end thereof to the piston 153. The other end portion of the piston rod 152 exposed to the outside from the cylinder 151 is pivoted to a second end portion 160b of a bell crank 160 having a triangular side which bell crank 160 is pivoted to the body frame 102 at a first end portion 160a thereof. Further, a third end portion 160c of the bell crank 160 is pivoted to one end of the piston rod 141 of the damper 140.

In the same manner as previously described, as the piston 132 slides within the head pipe 130 with up-and-down movements of the compression rods 135 and the piston rod 131, the hydraulic oil is fed into and discharged from the hydraulic oil chamber $S_5$ of the cylinder unit 150 through the oil hose 145, whereby the piston 153 and the piston rod 152 are driven, thus allowing the bell crank 160 connected to the piston rod 152 to perform a rocking motion. This rocking motion of the bell crank 160 is converted to vertical movements of the piston rod 141 of the damper 140, so that the damper 140 effectively absorbs and cushions external forces by virtue of its damper action.

Also in the above second embodiment, both the reduction in weight of the steering system and the improvement of the steering stability can be attained since the damper 140 is disposed on the vehicle body side.

A front wheel shock absorbing system according to a third embodiment of the present invention will be described below with reference to FIGS. 6 and 7.

Figure 6:
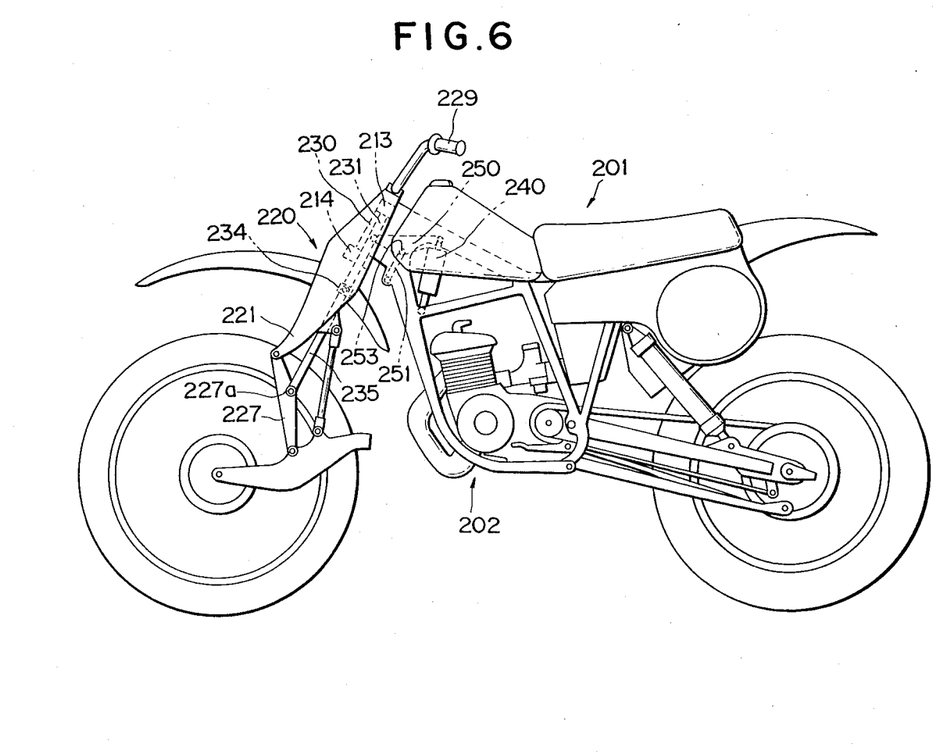
FIG. 6 is an entire side view of a motorcycle provided with a front wheel shock absorbing system according to a third embodiment of the present invention.

Referring to FIG. 6, there is illustrated a motorcycle 201 having a front suspension mechanism 220 which includes a body frame 202 and an upper fork 221. The constituent members are of the same constructions as in the foregoing first embodiment. Further, the lower end of each compression rod 235 is pivoted through a pin 227a to a substantially intermediate portion of a front arm 227 which is a movable link.

The upper fork 221 is connected to the body frame 202 so that it can be steered right and left through bridges 213 and 214 which are disposed respectively above and below a head pipe 230 fixed to the front end of the upper portion of the body frame 202 and which are adapted to be turned right and left in response to steering operations of a handle 229.

A rod-like slide member 231 is connected at its lower end to the upper ends of the compression rods 235 through a bearing head 234 so that it can turn right and left. The slide member 231 is slidably fitted in the head pipe 230, and a substantially intermediate portion thereof positioned within the head pipe 230 is pivoted to a front end portion of a bell crank 250 which is pivotably supported at another end portion thereof by an idler arm 251, the idler arm 251 being connected to the body frame 202 so as to be pivotable back and forth. The rear end portion of the bell crank 250 is pivoted to the upper end of a piston rod 241 of a hydraulic damper 240 the lower end of which is pivoted to the body frame 202.

Figure 7:
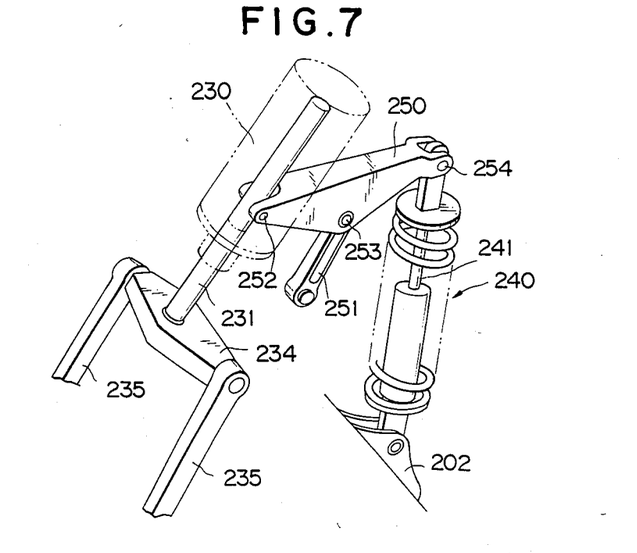
FIG. 7 is an entire perspective view of the front wheel shock absorbing system shown in FIG. 6.
Figure 8:
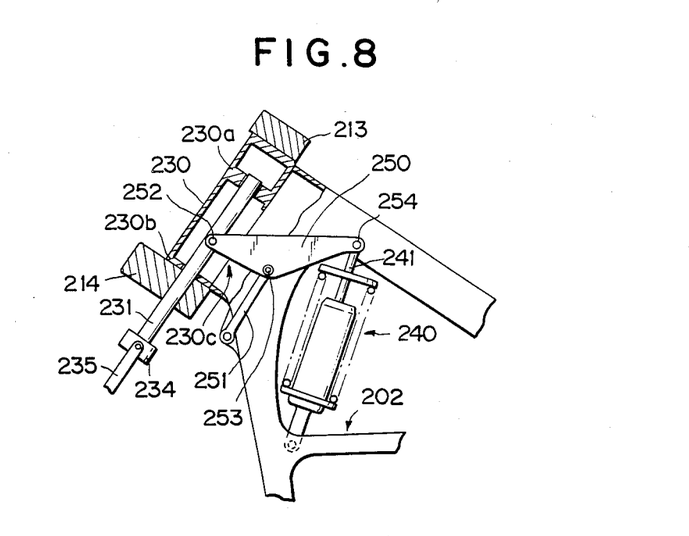
FIG. 8 is a partially cutaway side view thereof.

The force transmission path from the compression rods 235 up to the damper 240 is shown more in detail in FIGS. 7 and 8, particularly in FIG. 8. But, since the structure of the bearing head 234 which connects the compression rods 235 with the slide member 231 is the same as that shown in FIG. 4, its explanation is here omitted. As shown in FIG. 8, the portion of the slide member 231 extending into the head pipe 230 is supported by disk-like flanges 230a and 230b so that it can slide along the axis of the head pipe 230, the flanges 230a and 230b being formed within the head pipe 230 integrally therewith. On the other hand, the head pipe 230 has a vertically elongated slot 230c formed in the back thereof, and a first end portion 252 of the bell crank 250 is pivoted to the slide member 231 through the slot 230c. Further, a second end portion 253 of the bell crank 250 is pivoted to the upper end of the idler arm 251, and a third end portion 254 thereof is pivoted to the upper end of the piston rod 241 of the damper 240.

Also, in the motorcycle 201 having the front wheel shock absorbing system constructed as above, the compression rods 235 move up and down with vertical movement of the front wheel, so that the slide member 231 connected at its lower end to the compression rods 235 through the bearing head 234 slides up and down within the head pipe 230. This sliding motion of the slide member 231 in the head pipe 230 is converted to a rocking motion of the bell crank 250 whose first end portion is connected to the slide member 231, and this rocking motion of the bell crank 250 is converted to vertical movements of the piston rod 241 of the damper 240 whose upper end is connected to the third end portion of the bell crank 250, thus finally causing the damper 240 to operate. By virtue of the damper action of the damper 240 the forces transmitted from the front wheel side are effectively absorbed and cushioned whereby the improvement of comfortableness is attained.

Also in this third embodiment, since the damper 240 on the front wheel side is separated from the steering system and disposed on the side of the body frame 202, the weight of the steering system can be reduced by a weight corresponding to the weight of the damper 240, whereby the moment of inertial of the steering system induced by the steering operation of the handle 229 can be diminished, thus resulting in that the steering operation of the handle 229 becomes lighter and the steering stability is improved.

Moreover, as compared with a front wheel shock absorbing system of the type in which a damper is disposed on the upper portion of a vehicle body, the front wheel shock absorbing system of this embodiment permits lowering of the center of gravity of the vehicle body, whereby a further improvement of the steering stability can be attained.

Figure 9:
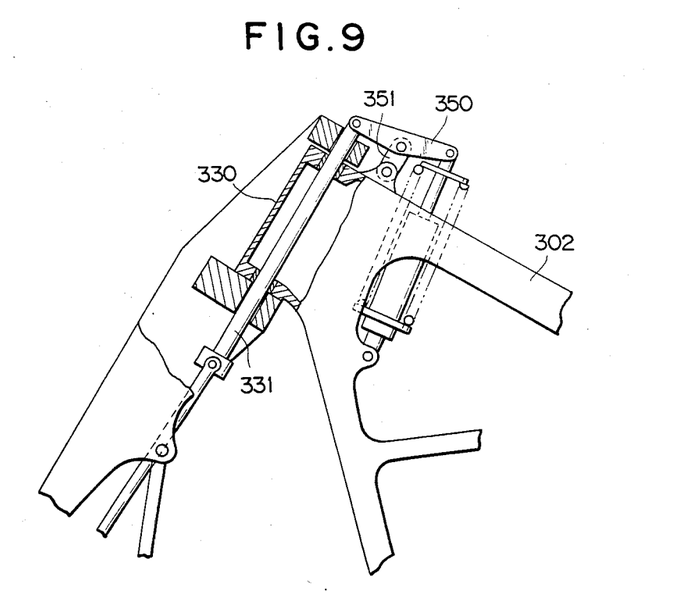
FIG. 9 is a partially cutaway side view of a front portion of a motorcycle provided with a front wheel shock absorbing system according to a fourth embodiment of the present invention.

Referring now to FIG. 9, there is shown a front wheel shock absorbing system according to a fourth embodiment of the present invention, in which a slide member 331 is slidably inserted into a head pipe 330, and a bell crank 350 is disposed at the upper portion of a body frame 302, with the upper end of the slide member 331 being connected with one end of the bell crank 350.

Also in this modified embodiment there can be obtained the same effects as those obtained in the foregoing embodiment.

In this embodiment, moreover, it is possible to provide a front wheel shock absorbing system of an extremely simple construction.

Although in this fourth embodiment the upper end of the slide member is connected to a damper through the bell crank, part of the slide member exposed below the head pipe may be connected to a damper attached to the body frame through a bell crank disposed on a nearby portion of the body frame.

I claim:

1. A front wheel shock absorbing system in a motorcycle having a body frame, a head pipe secured to a front end of said body frame, a front wheel and a front wheel suspension mechanism for supporting said front wheel, said front wheel suspension mechanism including at least one motion member adapted to move in accordance with up and down movements of said front wheel, said front wheel shock absorbing system comprising:

said head pipe constituting a hydraulic cylinder;

a force transmitting member having one end connected to said motion member for transmitting an external force applied to said front wheel;

a bearing head positioned in the transverse direction of the vehicle body and connected to said force transmitting member;

a slide member having one end connected rotatably to a substantially central portion of said bearing head so that the bearing head is rotatable about the axis of the slide member, said slide member being inserted into said hydraulic cylinder slidably in the axial direction of said head pipe so that its upper end is present within the cylinder, said upper end being provided with a piston adapted to slide within the cylinder; and a damper mounted on said body frame of said motorcycle and operatively connected with said slide member, said damper comprising a cylinder, a piston slidably fitted in said cylinder to partition the interior of said cylinder into an oil chamber and an air chamber, and a spring disposed within said air chamber for urging said piston, said head pipe being connected to said oil chamber of said damper hydraulically through an oil path means which includes a damping force generating valve.

2. A front wheel shock absorbing system according to claim 1, wherein said front wheel suspension mechanism comprises a link motion type front wheel suspension mechanism having a quadrilateral link mechanism, said quadrilateral link mechanism comprising an upper fork supported by the body frame of the motorcycle, a lower fork which supports the front wheel at its front end, and front and rear arms forming interconnecting both said forks, and said motion member comprises said front arm.

3. A front wheel shock absorbing system according to claim 2, wherein said force transmitting member comprises at least one compression rod member whose lower end is connectd to a substantially intermediate portion of said front arm so as to be pivotable within a vertical plane including said quadrilateral link mechanism.

4. A front wheel shock absorbing system according to claim 3, wherein one said compression rod member is disposed on each side of the front wheel, the upper ends of said compression rod members being connected to both ends of said bearing head positioned in the transverse direction of the vehicle body so that each said compression rod member is pivotable within a vertical plane including said rod member and extending in the longitudinal direction of said motorcycle.

* * * * *